United States Patent [19]
Harada et al.

[11] Patent Number: 5,276,573
[45] Date of Patent: Jan. 4, 1994

[54] SLIDER UNIT CONTROLLABLY ACTUATED AT A SURFACE OF A MOVING INFORMATION RECORDING MEDIUM

[75] Inventors: Takeshi Harada, Toride; Masatoshi Kanamaru; Atsushi Hosogane, both of Chiyoda; Akiomi Kohno, Tomobe; Kenji Mori, Tsuchiura, all of Japan

[73] Assignee: Hitachi, Ltd., Tokyo, Japan

[21] Appl. No.: 801,352

[22] Filed: Dec. 2, 1991

[30] Foreign Application Priority Data

Dec. 1, 1990 [JP] Japan .................................. 2-400092

[51] Int. Cl.$^5$ .............................................. G11B 5/60
[52] U.S. Cl. ..................................................... 360/103
[58] Field of Search ......................................... 360/103

[56] References Cited

U.S. PATENT DOCUMENTS 4,669,011  5/1987  Lemke .................................. 360/103

FOREIGN PATENT DOCUMENTS 60-223088  11/1985  Japan .................................. 360/103

OTHER PUBLICATIONS

IBM T.D.B., vol. 12, No. 8, Jan. 1970, Control of Slider Aerodynamics in Disk Files; W. Nystrom & E. Valstyn.

Primary Examiner—A. J. Heine
Attorney, Agent, or Firm—Antonelli, Terry, Stout & Kraus

[57] ABSTRACT

A slider unit having a reading or reproducing head, with the head being adapted to float over a surface of an information recording disc. The slider unit includes a slider body having a flying height sensor with float surfaces on an underside thereof to generate a lifting force. A piezoelectrically or electrostatically controlled valve layer may be positioned over a vent communicating between an upper surface of the slider, with the vent opening to a recess for generating a negative lift component at an underside of the slider unit. The slider body is made from a ceramic base portion and includes a semiconductive insert portion of, for example, silicon or a photosensitive glass with an adjustment device being formed by utilization of microfabrication techniques such as deposition and etching.

21 Claims, 5 Drawing Sheets

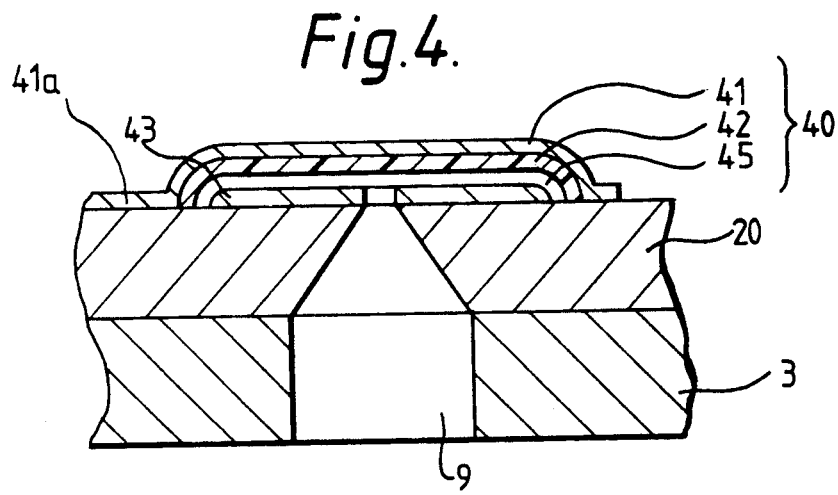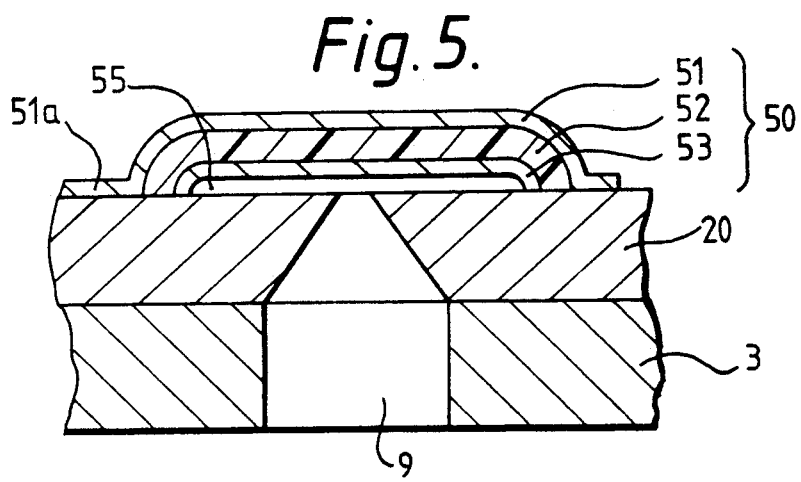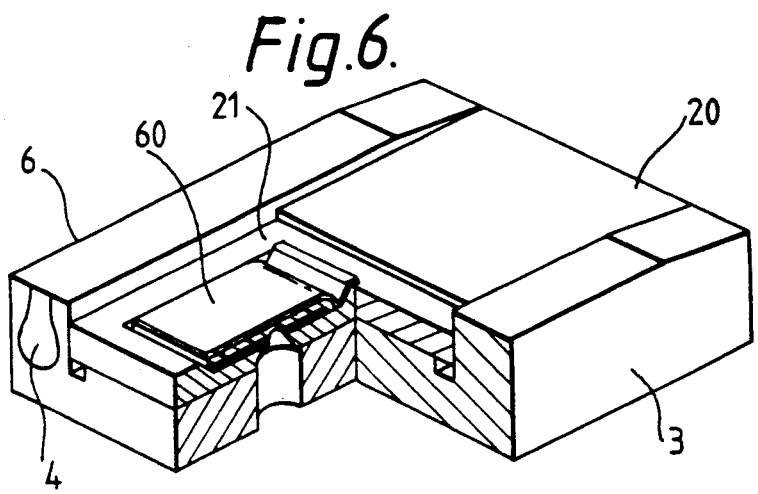

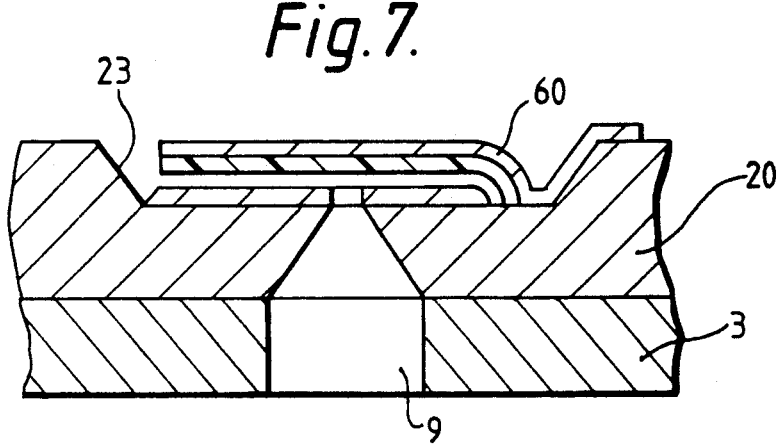
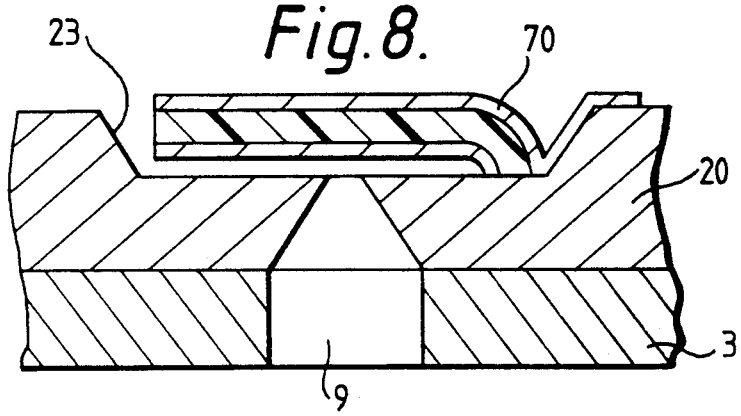
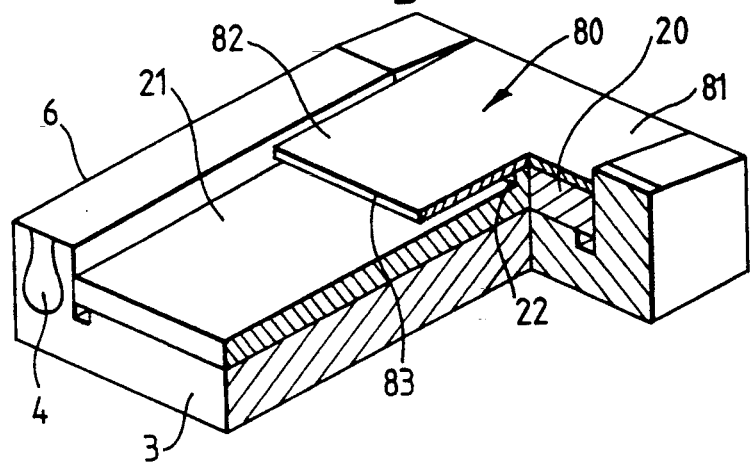

SLIDER UNIT CONTROLLABLY ACTUATED AT A SURFACE OF A MOVING INFORMATION RECORDING MEDIUM

FIELD OF THE INVENTION

The present invention relates to slider units which are used to carry a reading or reproducing head at the surface of an information recording medium such as a disc and the use of slider units in information recording devices.

BACKGROUND OF THE INVENTION

The concept of head-carrying slider units which float in near-contact against a disc surface, subject to a lift force generated by frictional air movement due to the relative movement of the slider and disc is well know. The slider units have been applied in information recording devices for use, for example, as an external memory for information processing apparatus such as computers and word processors. A recording medium used is typically a magnetic or optical disc, although other media may also be used.

A typical slider unit for carrying the reading or reproducing head, typically includes a magnetic head or optical head, formed with an air bearing structure on that side which faces the medium in use (hereinafter called the "float side"). Air passing between the float side and the medium generates a lift force on the slider unit. Usually the slider unit is mounted at the end of an arm which can exert a force towards the medium to counterbalance the lift force, to achieve a stable floating condition with a small gap (referred to hereinafter as the "flying height") between the slider unit and the medium surface.

It is generally recognized that the flying height should be maintained as small as possible, indeed approaching zero, so as to maximize the information density that can be recorded on or reproduced from the information medium. For example, the flux from a magnetic recording head diverges away from the heat so that the necessary area for one bit of information increases with increasing distance of the head from the medium. Accordingly, various proposals have been made to reduce the flying height to a distance of the order of a few tens of microns ($\mu$m) or less.

The technical problems of controlling the flying height under these conditions are large. A typical slider unit may several tens of mg and must be supported at an infinitesimal spacing from a fast-moving medium, for example, a disc rotating at several thousand rpm. Furthermore, the variation of this tiny spacing must be rigorously minimized.

DESCRIPTION OF THE PRIOR ART

The prior art contains a number of proposals for reducing and stabilizing the flying height.

JP-A-63/94479 describes a piezoelectric actuator for exerting a controllable downward force at the supported end of the load arm on which the slider unit is mounted. A sensor determines the flying height of the slider unit and the piezoelectric element responds to variations therein with a correcting force on the load arm. However, the response is found to be slow, and the controllability of flying height variation is therefore poor.

JP-A-62/167681 describes a slider unit having a cavity on the float side between the "rails" for generating the positive lift. A metal or plastic insert between the rails has a thin limb on which a sub-slider including the head is mounted. The sub-slider is thus freed from the inertia of the main slider, and its height is controlled either by selection of the elasticity of the thin limb or by constructing the thin limb as a piezoelectric actuator whose angle can be adjusted in response to a flying height measured from the sub-slider. It has been found that it is very difficult to maintain the flying height to a steady level using such a construction.

Both the above sliders are "positive pressure sliders" in which the force generated at the float slide predominantly pushes the slider away from the medium surface. "Negative pressure" sliders have also been proposed, in which the slider construction also produces a negative lift component towards the medium surface. Usually this is accomplished by a recessed section of the float side into which air passing the float side expands, for example, beyond a rearwardly-facing step on the float side. The recess is usually provided between side rails which generate the positive lift component. The negative component has a tendency towards the medium surface at the slider unit itself and hence a better response characteristic. This construction is preferably for very high information recording density. The downward force applied to the load arm can be reduced, which extends the life of the medium and the slider, particularly with a "contact start or stop" type in which the slider rests against the medium when not operating. In a non-contact start and stop type, the negative pressure component can improve the "self-loading", for example, the initial approach movement made by the slider unit towards the medium surface and a steady floating state.

JP-A-63/21272 describes a slider having a negative pressure generating recess. Control is achieved using a vent hole bored through from the negative pressure pocket to the top surface of the slider, and a piezoelectric flap lying over the top surface of the vent hole. Piezoelectric control of the flap acts like a valve on the vent hole and regulates the negative pressure and hence flying height. In an alternative proposal, a transverse rail forming a step at the front of the negative pressure generating recess is made of piezoelectric material so that its height can be adjusted to adjust the negative lift.

U.S. Pat. No. 4,853,810 describes a slider unit having a special tunneling electrode adjacent the head, seeking to achieve a very fine control of the flying height of the head. In the proposed construction, an aerodynamic wing is provided on the slider unit and it is suggested that the aerodynamic wing be made by microfabrication technology. However, no information is provided about the actual manufacture of the wing, the shape, control or position on the slider unit, and no possible implementation of the microfabrication is proposed.

It is generally true of the above documents that they do not consider the manufacturing methods that can be used to make the various control devices proposed. It is important to consider that the body of the slider unit is typically made of a hard ceramic material such as zirconia because the surfaces thereof which may contact the recording medium must be very hard and flat. These materials are difficult to machine and it is difficult to bond parts to them, particularly small parts.

SUMMARY OF THE INVENTION

A first object addressed by the present invention is to provide a novel construction of a slider unit. A second object addressed by the present invention is to provide the construction so that the slider unit can be mass produced relatively easily while still enabling control of the flying height. A further object addressed by the present invention is that of providing new production methods for such slider units. According to the present invention, a mechanism, a device for controlling a flying height is formed in an integrated manner on a one piece semi-conductive material, for example, silicon or photosensitive glass. The choice of materials susceptible to microfabrication enables this to be easily accomplished using, for example, deposition and etching techniques of a known nature, and also makes possible the mass production of many such devices on a wafer of the material. The piece of semi-conductive material incorporating the lift adjusting formation is then fixed to another part or parts to make up either the slider body or the semiconductive substrate piece comprised therein.

In one specific aspect, the invention provides a slider unit comprising a slider body and a reading or reproducing head, for operation at the surface of the information recording medium moving relative thereto, whereby air movement between a float side of the slider unit and a surface of the medium causes a lift force on the slider unit, with an adjustable element being provided for adjusting the lift force on the slider body. The slider body comprises a substrate portion of a semiconductive material, and the adjustable element is integrally formed thereon.

Preferably, a sensor is provided for measuring the flying height and is also included in the slider unit, for example, on the slider body.

One preferred application of the technique of the present invention is in a negative pressure slider in which the slider body has a recess on a float side. The recess may be formed partially or entirely in the semiconductor substrate material thereby facilitating its formation. For example, the semiconductive material may be formed with a step which is at one limit, for example, the forward end of the negative pressure generating recess. Side limits of the recess may also be formed in the semiconductive material or they may be defined in the assembled slider body by side portions of the basic body material (usually ceramic) which project forward toward the float side. Typically, these are side rails having float side surfaces for generating positive lift force.

A variety of adjustable means may be provided for controlling the lift, using the easier fabrication afforded by the use of semiconductive substrate or insert. The slider unit may have a negative pressure generating recess and also a vent communicating the recess on the float side to an exterior at another part of the slider body, for example, the opposite side.

A valve element control a flow through the vent and is formed on the semiconductor substrate. The valve element may be a bridge or cantilever layer, extending over an opening of the vent so that the valve element can entirely or partially close the vent, preferably, on the float side. Such valve members may be formed on the semiconductor substrate by a deposition and etching technique in a conventional manner. To enable control of the valve element by electrical means, the electrical means may be a multi-layer construction forming a piezoelectric or electrostatic actuator.

To reduce disturbance of air flow, the valve member may be itself recessed into a surface of the semiconductor piece at the vent opening and then may be fashioned so as to be substantially flush with the surrounding surface.

There are various ways in which a microfabricated movable layer construction of the semiconductive substrate can be used to control lift.

Another possibility is a controllably movable wing or vane on the semiconductor substrate. Again, this is preferably provided on the float side and may be associated with the negative lift generating recess. It may enable variation of the negative pressure generated by the recess, for example, by enabling variation of the height of a step at the front of the recess. Alternatively or additionally, the controllable movable wing or vane may, itself, be capable of generating a positive lift component by being positioned towards a rear of a negative pressure generating recess or at some other portion of the slider.

Usually, the vent includes a hole through the semiconductive substrate.

In accordance with further features of the present invention, a slider unit is provided for operation at a surface of an information recording medium moving relative thereto, whereby air movement between a float side of a slider unit and the medium causes a lift force on the slider unit, with the unit comprising a slider body and a recording or reproducing head, and with a vent being provided through the slider body from the float side. Means for adjustably controlling the degree of opening of the vent is formed on a semiconductive substrate comprised in the slider body.

In accordance with further features of the present invention a slider unit is provided for operation at a surface of an information recording medium moving relative thereto whereby air movement between a float side of the slider unit, and the medium causes a lift force on the slider unit, with the slider unit having a slider body and a recording or reproducing head. A recess is provided on the float side to create a negative lift component, and means are provided on the float side for adjusting a lift force in response to information from a flying height sensor provided in the slider unit. The slider body includes, on a float side thereof, an insert portion of a semiconductive material which is shaped on the float side to provide said recess and which carries the means for adjusting the lift force.

In accordance with yet additional features of the present invention, a slider unit is provided which comprises a slider body and a recording or reproducing head for floating operation at the surface of an information recording medium which moves relative thereto. The slider body includes a float side which faces the surface of the medium in use, and a ceramic portion provided which includes a central part and side rails which extend longitudinally along opposite edges of the central part and project to the float side. A semiconductive insert portion is fixedly bonded to the ceramic portion in the float side between the side rails thereof, with the float side surface of the fixed semiconductive insert portion being provided with at least one integrally formed and etched lift force control formation.

Accordingly, a generally conventional slider configuration having a main ceramic substrate with a central part and side rails may compliment a semiconductive insert formed in accordance with the present invention to provide a composite construction in which the hardness of the ceramic material provides the desired properties at the extremities of the float side, while the susceptibility of the semiconductive insert to microfabrication enables the provision of sophisticated lift control means.

The ceramic portion may, for example, be zirconia, titania or alumina based ceramics.

A slider according to any one of the features of the present invention outlined above, may be mounted on an arm of an information recording device, in a manner which is generally conventional. The information and recording device is provided as a further aspect of the present invention.

In accordance with the present invention, method of making a slider unit which has a slider body and a recording or reproducing head, for use at a surface of an information recording medium moving relative thereto is provided whereby air flow between the float side of the slider unit and the medium causes a lifting force on the slider unit, and with an adjustable element being provided for adjusting the lift force in response to a sensed flying height of the slider body.

The method of the present invention includes forming the lift adjusting element on a semiconductive substrate and fixing the semiconductive substrate to a base substrate to form the slider body.

As described hereinabove, the method of the present invention is susceptible of implementation by using conventional microfabrication techniques such as a thin-film deposition, fine pattern exposing, and forming using anisotropic and/or isotropic etching techniques. A skilled artisan is well aware of the manner of using these techniques to make, for example, piezoelectric and electrostatic actuators in the form of movable flaps or bridges on the semiconductive substrate.

Similarly, the formation of steps and/or recesses in the surface of such a semiconductive substrate is a straightforward matter using conventional etching-/masking techniques.

Most desirably, the method of the present invention is implemented in a mass production regime. In this respect, according to the present invention, a method is proposed for making a plurality of slider units each having a slider body and a recording or reproducing head, for use at the surface of the information recording medium and each slider unit includes a control element for modifying a lift force generated while in use between a float side of the slider body and the medium.

Advantageously, according to the method of the present invention, an array of the control elements are formed on a parent piece of the semiconductive material, the parent piece is subdivided into plural substrate portions each formed with an adjustable element, and the respective substrate portions are fixed to respective ones of the plural base substrates to form the slider bodies.

The base substrates, usually made of a ceramic material, can be formed by an array of recording or reproducing heads on a parent piece of the base substrate, with the substrate being subdivided into plural base substrate precursors, and with the base substrate precursors being shaped to form the base substrates.

As noted above, the control element may comprise a piezoelectric unimorph or bimorph, or an electrostatic actuator.

To fix the semiconductive substrate to the base substrate, which is usually fashioned of a ceramic material, methods such as brazing or anode bonding may be used. Preferably, the bonding temperature may be about 250° C. or less, an inorganic or metallic material may be used for bonding.

As can be appreciated, the method described above may avoid the need for carrying out complex shape-forming on a relatively unmachinable material such as zirconia ceramic. Furthermore, since the delicate control mechanism can be formed by microfabrication techniques which are well adapted to forming micro-scale formations, but can be made on a semiconductive substrate of a significant side which is easily handled, it is not necessary to bond a very small adjustment or control mechanism to a ceramic slider body. The bonded part and its bonding surface can be made larger and considerably simpler than in previously proposed constructions thereby making the assembly easier.

In a further aspect of the present invention, a method is provided for controlling a slider unit in operation at the surface of the information recording medium, in which the slider unit contains any of the features outlined hereinabove.

The preferred flying height may be as low as 0.1 $\mu$m or less, even as low as 0.05 $\mu$m or less. At 0.1 $\mu$m, it should be possible to achieve an information recording density of $5 \times 10^5$ bits/mm$^2$, and so, preferably, an information recording density of at least this value is achieved.

BRIEF DESCRIPTION OF THE DRAWINGS

Embodiments of the present invention will now be further described by way of example, with reference to the accompanying drawings wherein:

FIG. 4 is a longitudinal cross sectional view through an electrostatically-actuated control valve of FIG. 3;

FIG. 5 is a corresponding cross section of an alternate embodiment using a piezoelectric actuator;

FIG. 6 is a partial cross sectional respective view of a second embodiment employing a cantilevered control valve;

FIG. 7 is a longitudinal cross sectional view of the cantilevered control valve of the embodiment of FIG. 6 using an electrostatic actuator;

FIG. 8 is a cross sectional view of another embodiment utilizing a piezoelectric actuator;

FIG. 9 is a partial cross sectional perspective view of a float side of a third embodiment of a slider unit using a movable wing to vary a negative lift component;

FIG. 13b is a perspective view of substrate precursors cut from the parent slab of FIG. 13a;

DETAILED DESCRIPTION OF THE PREFERRED EMBODIMENTS

Figure 1:
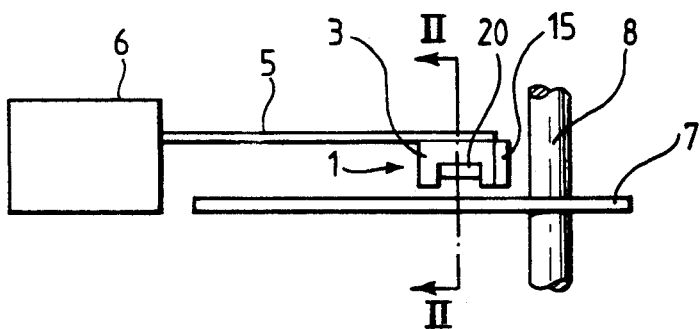
FIG. 1 is a schematic view of an information recording device comprising a slider unit.

With reference to FIG. 1, an information storage device comprising a negative pressure slider 1 supported by a load arm 5 over a surface of a magnetic or optical disc 7, rotatably mounted on a driving shaft 8. A radial positioning of the slider 1 relative to the disc 7 is carried out in a conventional manner by an actuator 6 such as, for example, a voice control motor or a piezoelectric element.

When the disc rotates at an operational speed, air carried along by frictional engagement with the surface of the disc 7 passes between that surface and the slider 1, generating a lifting force between them which holds the slider 1 floating above the surface of the disc 7.

Figure 2:
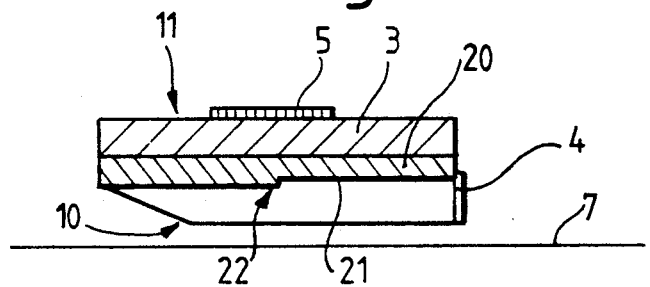
FIG. 2 is a longitudinal cross-sectional view taken along the line II—II in the slider unit of FIG. 1, showing a general construction of the body thereof.
Figure 3:
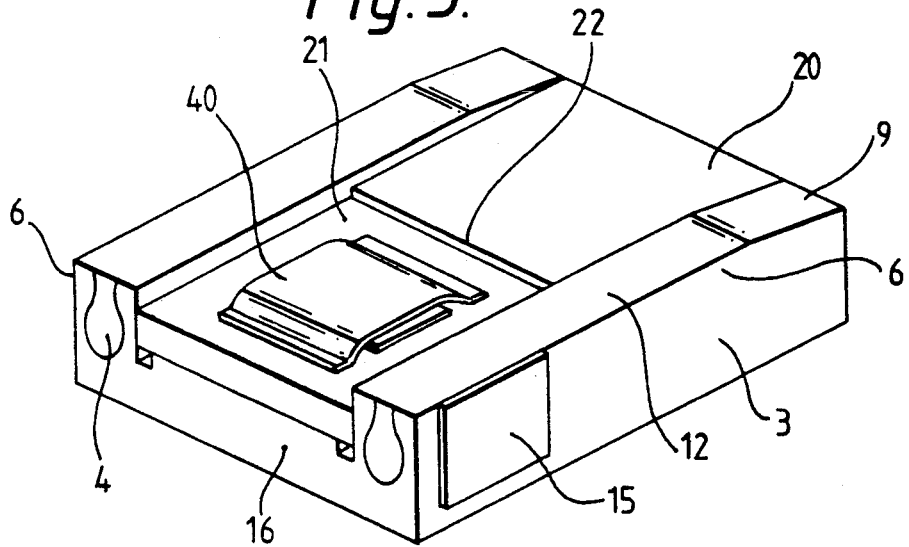
FIG. 3 is a perspective detail view of the float side of the first embodiment of the slider unit.

As shown in FIG. 2, an end of the cantilevered load arm 5 is fixed to a top surface of the slider body, with a bottom or float surface 10 of the slider body having a general configuration shown most clearly in FIG. 3, which depicts the slider body in an inverted position.

The slider body includes a ceramic main body 3, for example, fashioned of a zirconia based ceramic, having a general downward-facing channel shape, and an insert substrate 20 made of silicon which is fixed in the channel opening of the main body 3. The main body 3 comprises a flat central portion 16 with integral downwardly-projecting rail portions 6 extending along each side thereof for substantially a full length of the body. The downwardly-facing surface of each rail 6 is machined so as to be very flat and smooth and forms a positive lift-generating surface for the body 3. At its front end, each surface 12 has a forwardly and upwardly inclined portion for assisting in a generation of the lifting force. A recording or reproducing head 4 is integrally formed at a rear end of each of the side rails and, each head, in the illustrated embodiment, is a magnetic head having a conventional construction, with the head 4 extending, in a conventional manner, to a lowermost extremity of the rail 6 of the float side so as to be as near as possible to the recording medium during operation.

The semiconductor insert 20 occupies a full width of the channel formed between the two rails 6 and also extends for a full length of the slider body. In the illustrated embodiment, it is a rectangular piece having a flat upper surface bonded to the opposing flat surfaces of the main body center 16 by anode bonding. A brazing or soldering fixing may be used. The lower surface of the insert 20 on the float side, is also generally flat but has a substantially recessed portion 21 at a rear portion thereof occupying about a half of a length and creating a transverse perpendicular step 22 in a middle region. The step 22 may be spaced towards a forward end of the slider if desired. In operation, air passing between the slider float side and the medium surface, and between the rails 6 expands upwardly into the recess 21 as the air passes the transverse step 22, causing a reduction in the pressure of the air and a downward force component at this part of the slider.

A flying height sensor 15 is attached to a side surface of the slider body, with the flying height sensor being, for example, a capacitance direction, optical or ultrasonic type sensor. Such sensors and their construction are conventional and well known to one of ordinary skill in the art. In this context, the use of a very small integrated-type measuring instrument manufactured using semiconductor fabrication technology is preferable.

An apparatus for effecting controlled and adjustable variation of the lift force is provided on the semiconductor insert 20, and a first embodiment of such means is described in connection with FIGS. 3 and 4.

More particularly, a cylindrical vent hole 4 is formed through a central layer 16 of the ceramic body 3, downwardly from the top surface 11 thereof and is in alignment with a corresponding hole through a semiconductor insert 20 formed generally in a center of a recess portion 21. Through the semiconductor layer 20 a vent hole 9 tapers to a small opening at the float side. A control microvalve 40 is formed on the surface of the semiconductor insert at the opening of the vent 9.

The microvalve 40 comprises a flat layer of an electrostatic actuator, spaced a short distance above the opening of the vent 9, with FIG. 4 providing a detailed illustration of the construction of the microvalve 40. The electrostatic actuator has a bridge structure mounted on opposite sides of the vent opening, with the fixed electrode layer 43 being deposited around the end opening and having a corresponding hole. A movable layer is spaced above the fixed electrode 43 by a thin laminar gap 45 and comprises an insulating layer 42 on the inside and a further electrode layer 41 on the outside. Each of the layers 41, 42 and the gap 45 preferably has a thickness of 1–10 $\mu$m. The electrodes 41, 43 are preferably thin films of metals or sufficiently conductive semiconductor materials such as, for example, Al, Ag, Au, Ti or Si. The movable insulating layer 42 is preferably of a ceramic type layer such as, for example $SiO_2$, $Si_3N_4$, $Al_2O_3$ or plastics, such as, for example, polyimide. These thin films are constructed by sputtering evaporation, chemical vapor deposition (CVD) or plating techniques. Then the films are subjected to light exposure and etching processes to create the desired pattern. These techniques are generally known and can be referred to as a microfabrication technique. The vent opening through the monocrystalline silicon insert 20 and fixed electrode 43 can be constructed by anisotropic etching. The gap 45 is created by a conventional technique of sacrificial etching in which a layer initially deposited is then removed by etching from the exposed edge thereof.

Lead wires are connected to the movable and fixed electrodes 41, 43 by soldering or, preferably, ultrasonic bonding, with FIG. 4 providing an illustration of a connection location 41a for the movable electrode 41. These can then be connected to a DC supply installed on an external mount, with DC voltage being applied across the two electrodes 41, 43 causing an electrostatic attractive force between the electrodes 41, 43 and closing an opening of the vent 9 either completely or partially in dependence upon the applied voltage. By closing the vent 9, the negative lift component generated by the recess 21 is maximized. Consequently, the microvalve 40 provides a means for controlling, in a smoothly adjustable manner, the exact amount of the lift. The microvalve can be connected in a closed loop feedback system including the flying height sensor 15 so that a desired flying height is maintained during operation. That is, the flying height is monitored at all times by the flying height sensor 15. If the flying height becomes larger than a predetermined reference height, for example, 0.1 μm, deemed optimal for information recording or reproduction, a DC voltage initially applied across the microvalve electrodes 41, 43 is reduced so as to prevent an entire closing of the vent 9. The amount of voltage reduction is determined by a measured difference between the measured and preset flying heights. The resulting air flow in the vent 9 influences the negative lift to the desired degree which can be determined by calibration and adjust the flying height continuously towards the desired reference level. A control circuit connected to the DC supply enables the closed-loop control.

FIG. 5 provides an example a variation of the microvalve and, in particular, a microvalve 50 is provided with the vent being formed as described hereinabove but the microvalve 50 is piezoelectrically actuated. The microvalve 50 comprises a movable bridge made of three layers formed on the monocrystalline silicon substrate 20 by microfabrication. A top electrode layer 50 and a bottom electrode layer 53 are separated by an intermediate layer 52 of piezoelectric material. All three layers are integrated in the bridge structure and there is no fixed layer.

Electrodes 51, 53 are connected to a DC supply as in the construction described hereinabove in connection with FIG. 4, using, for example, an electrode bonding pad 51a. An application of voltage between the electrodes distorts the piezoelectric layer 52 and the bridge may move across a laminar gap 55 to close off the opening of the vent 9 to a desired degree. Closed-loop lift control can be performed as described hereinabove.

In the second embodiment of FIGS. 6 and 7, the slider body 1 and the vent 9 are generally similar to those described in the first embodiment; however, the microwave movable member is different and is supported at only one side so as to form a cantilever, with the construction being most clearly shown in FIGS. 6 and 7 wherein, it is apparent that the cantilever microvalve member 60 forms an electrostatic actuator in a manner analogous to the bridge of FIG. 4. The construction and operation of the cantilever actuator 60 are also analogous to the construction of FIG. 4; but the cantilever version may have a larger distortion for a given applied voltage which may widen an adjustment range of the lifting force.

A further features is shown in the embodiment of FIGS. 6 and 7 in that a local recess 23 is formed in a general surface of the large recess 21 in the semiconductor substrate 20. The local recess is only slightly larger than, and the same thickness as, the electrostatic actuator which is formed in it in its rest condition. Consequently, the cantilevered microvalve actuator member causes less disturbance of the air flow past the slider which is a preferable arrangement. The bridge embodiments described hereinabove in connection with FIGS. 4 and 5 may also be formed in the local recesses.

The embodiment of FIG. 8 is analogous to FIG. 5 and, in FIG. 8, a cantilevered microvalve member is fashioned as a piezoelectric actuator 70 likewise formed in a local recess 23, with the construction operation of the piezoelectric actuator 70 being analogous to those described above.

In the third embodiment of FIG. 9, the general construction of the slider body base 3 and semiconductor insert 20 are as described above except that the transverse step 22 of the insert 20 is displaced towards a front end, for example, about one quarter of the way back. Behind the step 22, the recessed insert surface is flat and a lifting force adjusting mechanism is fashioned as a movable wing 80 formed at a front of the slider body. The movable wing 80 is formed by a substantially rectangular deposited layer having an anchoring portion 81 at the front, covering the front non-recessed portion of the silicon insert 20, and a movable portion 82 extending rearwardly over the step 22 and with a narrow spacing above the surface of the recessed part 21. A free straight rear edge 83 of the wing terminates about half way along the slider.

Figure 10:
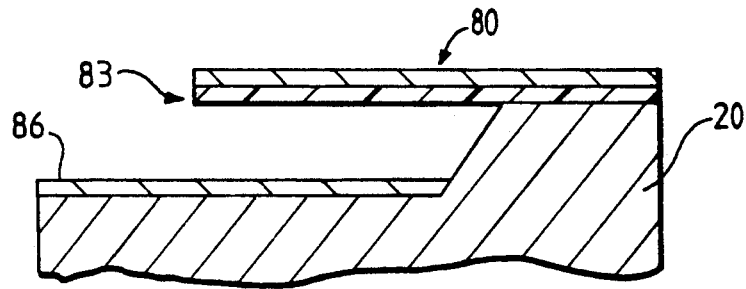
FIGS. 10 and 11 are partial cross sectional views of a movable wing using an electrostatic actuator and piezoelectric actuator respectively.
Figure 11:
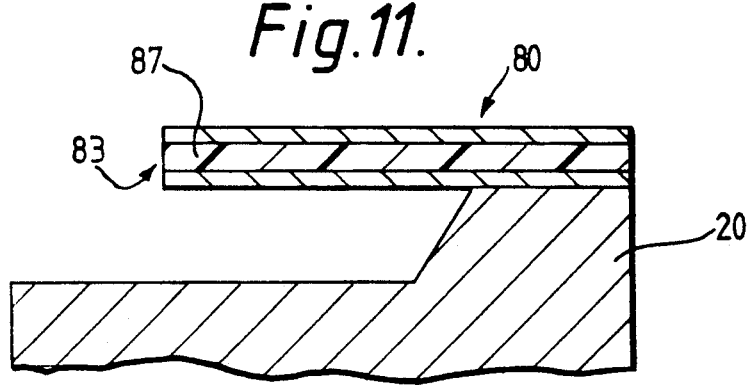

FIGS. 10 and 11 provide an example of the manner by which the wing may be made as an electrostatic actuator (FIG. 10) or as a piezoelectric actuator (FIG. 11). The electrostatic actuator may have a fixed electrode formed under the wing on the opposing surface of the recessed silicon substrate 20. The wing itself may comprise a usual lower insulating layer and an upper electrode layer with the operation thereof being analogous to that described hereinabove.

In the piezoelectric version of FIG. 11, the wing-forming layer 80 comprises a piezoelectric layer 87 sandwiched between two electrode layers. The flat construction of the wing layer 80 may be formed very simply by well known techniques.

In the embodiment of FIG. 11, no vent is provided through the slider body. When the wing 80 is deflected by application of voltage, the effective depth of the recess 21, relative to air approaching the recess over the wing 80 changes. The negative lifting force is increased if the recess is deepened and decreased if it is more shallow.

Figure 12:
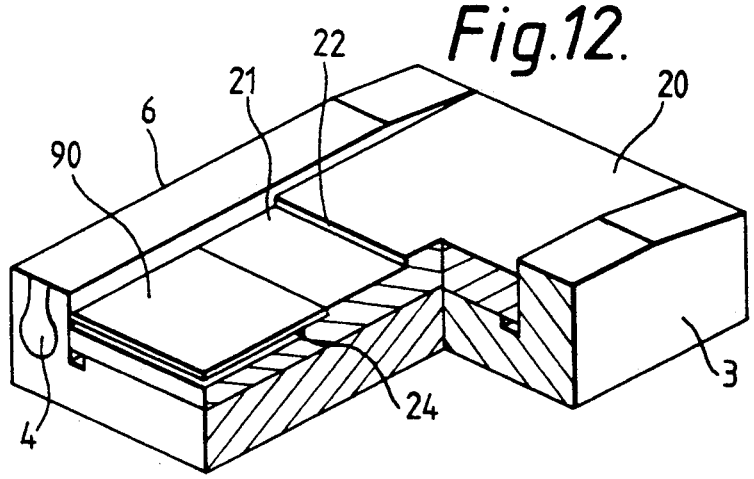
FIG. 12 is a perspective partial cross sectional view of a fourth embodiment of the present invention utilizing a movable wind for generating a positive lift component.

In the fourth embodiment of FIG. 12, the slider body is generally as described hereinabove; however, the silicon insert 20 is formed with two transverse steps. The main transverse step, as before, defines the recessed portion 21 over about a half of an area of the insert 20. An additional step 24 extends transversely across the insert 20 about halfway back along the main recess 21, defining a more deeply-recessed portion. The lift adjusting member comprises a movable wing 90 projecting rearwardly from the second step 24 and has, it free edge flush with the rear of the slider body in alignment with heads 4. The wing 90 has a cantilever construction spaced over the more deeply-recessed portion which can be formed in the same manner as described hereinabove in connection with FIGS. 10 and 11. By changing the applied voltage to move the wing 90 up or down, the lift can be adjusted and, in particular, by moving the free end of the wing away from the slider body towards the passing medium, a positive lifting force can be obtained and adjusted, which force acts at or adjacent to the rear end of the slider body.

In accordance with the method of the present invention for making slider units, information recording or reproducing heads 4, of a conventional construction, are formed in the appropriate end portions of a ceramic main body substrate of a slider material, for example, of a $ZrO_2, TiO_2$-based ceramic material, with the head forming process being carried out in a conventional manner.

The slider material, with the formed heads, is then machined into a base substrate 3 having the parts as shown in, for example, FIG. 3 and the base substrate may, for example, be 2 to 4 mm in length, 1.5 to 3 mm in width, and 0.5 to 1 mm in thickness. If a venting adjustment is to be used, a vent hole is bored in the appropriate portion.

A semiconductive substrate of silicon or photosensitive glass is provided with desired lift modifying and adjusting components. For example, a recessed section 21 with its step 22 may be formed by anisotropic etching of monocrystalline silicon using, for example, a potassium hydroxide solution. An appropriate depth of the recess may be about 5 to 100 μm. By an etching method, a desired shape can be obtained with precision and without the risk of forming fine cracks as would be likely to happen if machining methods such as, for example, cutting were used. A necessary air vent hole may be formed in the corresponding fashion and microvalve and/or wing elements may be formed by the deposition/etching techniques described above. More particularly, thin film deposition methods such as sputtering, evaporation, CVD and plating, fine pattern exposure techniques, and anisotropic and isotropic etching techniques may be used.

The semiconductor piece bearing the necessary lift control formation is cut to a chip of about 2 to 4 mm in length and 1 to 2 mm in width. The slider base substrate 3 and semiconductor chip 20 are bonded together to provide the desired slider body with a lift control means.

If a photosensitive glass is used for the insert part, anisotropic etching can be performed by UV irradiation of an exposed pattern which is to be etched. Irradiation causes a phase change rendering the exposed pattern vulnerable to wet etching, thereby providing the desired formation.

Bonding of the semiconductor and base substrates may be carried out in the following manner. An In-Sn alloy is sandwiched between a base substrate and a semiconductor substrate at a pressure of 0.1 kgf/mm$^2$ at a temperature below 250° C. thereby bonding them together. Alternatively, a low-melting point glass adhesive may be used having a softening point of about 250° C. A further embodiment uses a metal film formed on the junction surface of the main body substrate against which the semiconductor insert is pressed at a temperature of, for example, 250° C., and with the application of several tens to several hundred volts between the two components. This achieves so-called anodic or voltage application bonding which utilizes electrostatic force to bond members having ion conductivity.

Figure 13A:
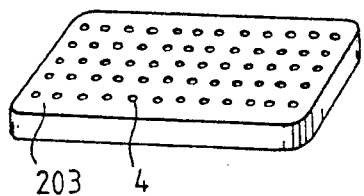
FIG. 13a is a perspective view of a parent slab formed with an array of recording or reproducing heads.
Figure 13B:
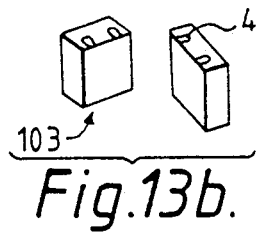
Figure 13C:
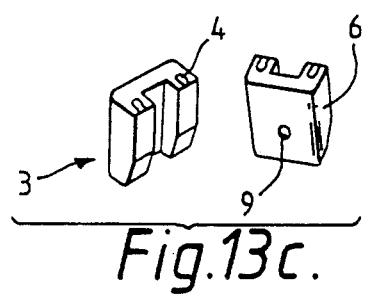
FIG. 13c is a perspective view of the precursors of FIG. 13b after machining, grinding and drilling.

FIGS. 13a-13c, 14a-14c and 15 provide examples of the concept of the present invention which enables an extension of the mass production method. More particularly, as shown in FIG. 13a, a parent slab of a zirconia based ceramic is formed with an array of information recording or reproducing heads 4 which, in themselves, are conventional. The slab 203 is subdivided to form a plurality of rectangular slider substrate precursors 103 (FIG. 13b) each having a pair of the heads 4 as in the desired slider unit. Then each of the precursors 103 is machined to form the desired channel configuration with the slide rail 6, shaped positive lift surfaces 12 and, if desired the vent hole 9 (FIG. 13c).

Figure 14A:
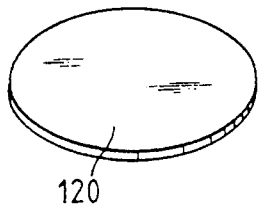
FIG. 14a is a perspective view of a standard wafer of silicon or photosensitive glass.
Figure 14B:
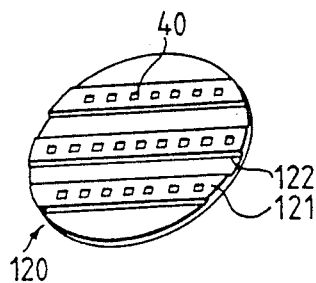
FIG. 14b is a perspective view of a standard wafer after being subjected to a deposit/etching operation.

FIG. 14a provides an example of a circular standard wafer 120 of silicon or photosensitive glass. By etching and deposition techniques, the nature of which have been discussed above, an array of the desired lift control formations is created in the wafer 120. As shown in FIG. 14b, for example, elongated recesses 121 may be created by etching, simultaneously forming step formations 122 at their edges. In the elongated recesses 121, an array of through holes for venting may be created by further etching. Utilizing the techniques described hereinabove, an array of controllable microvalves 40 can be fashioned by deposition and etching technique over each of the vent holes.

Figure 14C:
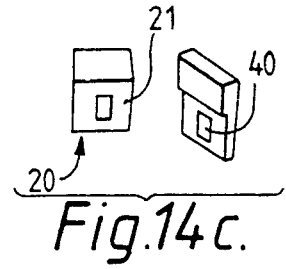
FIG. 14c is a perspective view of chips cut from the wafer of FIG. 14b.
Figure 15:
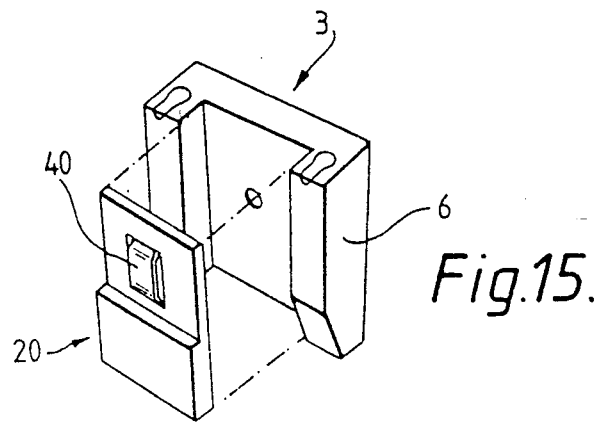
FIG. 15 is an exploded view of an assembly of the base substrates and inserts.

The prepared wafer 120 can then be cut into a plurality of chips 20 of an appropriate size as shown most clearly in FIG. 14c, with each of the chips 20 having the desired recessed portion 21 and microvalve 40 formed therein and which are readily insertable into a corresponding base substrate 3 from the process described hereinabove in connection with FIGS. 13a-13c, and bounded thereto in a manner described hereinabove. Since the fine components and, more particularly, the adjusting microvalve 40, are formed on an insert 20 which is inserted bodily in the bonding process, the risk of damage to the microvalve 40 is greatly reduced since it need not be considered in the bonding process.

We claim:

1. A slider unit for operation at a surface of a moving information recording medium, the slider unit comprising:
   a reading and reproducing head;
   a slider body having a front end, a rear end and a float side, said float side facing the surface of the information recording medium while moving and having a generating shape for generating a negative pressure, the slider body comprising a semiconductive substrate portion, and a movable flying height adjuster formed integrally on the semiconductive substrate portion; and
   means for sensing a flying height of the slider body above the surface of the information recording medium.

2. A slider unit as claimed in claim 1, wherein said means for sensing the flying height comprises a sensor fixed to the slider body.

3. A slider unit as claimed in claim 1, wherein the shape for generating the negative pressure includes a negative-lift generating recess at said float side thereof, and wherein said recess is formed at least partially in the semiconductive substrate portion.

4. A slider unit as claimed in claim 1, wherein the slider body includes a lift-modifying vent communicating therethrough from a vent opening at the float side, and wherein the movable flying height adjuster comprises a valve element extending over said vent opening.

5. A slider unit as claimed in claim 4, wherein the valve element comprises at least one deposition layer formed on the semiconductive substrate portion.

6. A slider unit according to claim 4, wherein the valve element comprises an actuator selected from the group consisting of piezoelectric actuators and electrostatic actuators.

7. A slider unit for operation at a surface of a moving information recording medium, the slider unit comprising:
   a reading and reproducing head;
   a slider body having a front end, a rear end and a float side, said float side facing the surface of the information recording medium while moving and having a lift-generating shape, the slider body comprising a semiconductive substrate portion, and a movable flying height adjuster formed integrally on the semiconductive substrate portion; and means for sensing a flying height of the slider body above the surface of the information recording medium, wherein the slider body has a negative-lift generating recess at said float side thereof, and the recess is formed at least partially in the semiconductive portion, and wherein said semiconductive substrate portion includes a transverse step defining a front edge of said negative-lift generating recess, and said transverse step is formed across the semiconductive substrate portion.

8. A slider unit for operation at a surface of a moving information recording medium, the slider unit comprising:

a reading and reproducing head;

a slider body having a front end, a rear end and a float side, said float side facing the surface of the information recording medium while moving and having a lift-generating shape, the slider body comprising a semiconductive substrate portion, and a movable flying height adjustor formed integrally on the semiconductive substrate portion; and means for sensing a flying height of the slider body above the surface of the information recording medium, wherein the movable flight height adjuster comprises a controllable wing, the controllable wing being projected rearwardly and being positioned on the float side of the slider body.

9. A slider unit as claimed in claim 8, wherein the controllable wing is an actuator selected from the group consisting of piezoelectric actuators and electrostatic actuators.

10. A slider unit for operation at a surface of a moving information recording medium, the slider unit comprising:

a recording and reproducing head;

a slider body carrying the recording and reproducing head and having a front end, a rear end, a float side between the front end and rear end and positioned to face the surface of the information recording medium while moving, wherein said slider body includes a vent extending through the slider body from the float side, said vent being adapted to generate a negative pressure, and wherein said slider body further includes a semiconductive substrate and adjustable vent-regulating means, said adjustable vent-regulating means being integrally formed on the semiconductive substrate and operable to control the amount of opening of the vent.

11. A slider unit as claimed in claim 10, wherein said adjustable vent-regulating means comprises at least one deposition-formed deformable layer positioned across an opening of the vent.

12. A slider unit as claimed in claim 11, wherein the at least one deposition-formed deformable layer is cantilevered over the vent opening.

13. A slider unit as claimed in claim 11, wherein said at least one deposition-formed deformable layer bridges the vent opening.

14. A slider unit as claimed in claim 10, wherein said semiconductive substrate includes a main surface and a seating recess, and wherein the vent-regulating means is position in said seating recess.

15. A slider unit for floating near a surface of a moving information recording medium, said slider unit comprising a recording and reproducing head, a slider body carrying said recording and reproducing head, and a sensor for detecting a flying height of the slider unit over a surface of the information recording medium;

the slider body including a front end, a rear end, and a float side between the front and rear ends and opposing the surface of the information recording medium while moving to generate a lift force to maintain said flying height;

the slider body further including a semiconductive insert fixed therein at the float side, said semiconductive insert being formed on the float side thereof and having a negative pressure generating recess;

the slider unit further including a lift-adjusting device for adjusting the flying height of the slider unit, the lift-adjusting device being mounted on the semiconductive insert.

16. A slider unit as claimed in claim 15, wherein the semiconductive insert has a transverse step and the lift-adjusting device comprises a movable wing fixed on the semiconductive insert forward of said transverse step and projecting rearwardly behind said step.

17. A slider unit for floating near a surface of an information recording medium, said slider unit comprising:

a ceramic base body, said base body having a central portion and two parallel side rails extending along opposite edges of the central portion and projecting outwards thereto;

a semiconductive insert fixed against the central portion of the ceramic base body between the two parallel side rails;

at least one member for adjusting a lift force and being microfabricated integrally on said semiconductive insert, and a recording and reproducing head.

18. A slider unit as claimed in claim 17, wherein the ceramic base body is formed of ceramic material selected from the group consisting of zirconia, titania and alumina based ceramic and wherein the semiconductive insert is a semiconductive material selected from the group consisting of silicon and photosensitive glass.

19. A slider unit as claimed in claim 17, wherein the lift force adjustment formation comprises a transverse step, extending between the side rails.

20. A slider unit as claimed in claim 17, wherein the lift force adjustment formation comprises an electrically-movable deformable layer structure.

21. An information recording device comprising an information recording medium drive, a movable arm being controllable and having an end, and a slider unit fixed to the end of the movable arm, said slider unit comprising:

a reading and reproducing head;

a slider body having a front end, a rear end and a float side, said float side facing a surface of an information recording medium while moving and having a lift-generating shape, and means for sensing a flying height of the slider body above the surface of the information recording medium;

the slider body comprising:

a semiconductive substrate portion, and a movable member for adjusting the flying height and being formed integrally on the semiconductive substrate portion.

* * * * *